(12) United States Patent
Suzuki et al.

(10) Patent No.: US 6,411,006 B2
(45) Date of Patent: Jun. 25, 2002

(54) ELECTRIC ROTARY MACHINE

(75) Inventors: Yuzuru Suzuki; Sakae Fujitani; Taketoshi Ohyashiki; Naoyuki Harada, all of Shizuoka-ken (JP)

(73) Assignee: Minebera Co., Ltd., Nagano-ken (JP)

( * ) Notice: Subject to any disclaimer, the term of this patent is extended or adjusted under 35 U.S.C. 154(b) by 0 days.

(21) Appl. No.: 09/791,303

(22) Filed: Feb. 23, 2001

(30) Foreign Application Priority Data

Feb. 24, 2000 (JP) ........................................ 2000-048099

(51) Int. Cl.[7] ................................................ H02K 1/06
(52) U.S. Cl. ........................ 310/254; 310/89; 310/218; 310/258
(58) Field of Search .................... 310/254, 89, 218, 310/216, 258, 257

(56) References Cited

U.S. PATENT DOCUMENTS 6,166,468 A * 12/2000 Suzuki et al. ............... 310/254
6,177,751 B1 * 1/2001 Suzuki et al. ............... 310/194
6,194,806 B1 * 2/2001 Suzuki et al. ............... 310/216

* cited by examiner

Primary Examiner—Burton S. Mullins
(74) Attorney, Agent, or Firm—Hutchins, Wheeler & Dittmar

(57) ABSTRACT

Electromagnetic conversion efficiency of an electric rotary machine is enhanced and reduction of leakage flux due to magnetic discontinuity can be realized without providing holes for positioning and fixing salient poles in a stator ring. Outer appearance and decency of the electric rotary machine as a product are also improved by not allowing lower ends of salient poles of an armature assembly to be exposed on an outer surface of the electric rotary machine. For this purpose a radial gap type electric rotary machine comprises a field magnetic pole consisting of a permanent magnet which is supported rotatably and an armature assembly consisting of a plurality of divided salient poles which oppose the field magnetic pole with a small air gap therebetween and are radially arranged with respect to a rotation axis. The armature assembly includes a first ring made of a soft magnetic member for receiving the plurality of salient poles and a second ring made of a soft magnet member for receiving the first ring.

12 Claims, 9 Drawing Sheets

ELECTRIC ROTARY MACHINE

BACKGROUND OF THE INVENTION

1. Field of the Invention

The present invention relates generally to an armature structure of a radial gap type electric rotary machine. More particularly, the invention relates to an armature structure of a radial gap type electric rotary machine, in which respective salient poles of armature are positioned by one of two rings and reluctance is lowered by the other ring.

2. Description of the Related Art

In a conventional electric rotary machine, in which an armature is constituted by a plurality of ring-shaped plate yokes made of a soft magnetic plate member such as silicon steel plate or the like and stacked in an axial direction, each ring-shaped plate yoke having a plurality of salient poles radially formed, since the ring-shaped plate yoke is punched out integrally with a plurality of salient poles, the salient poles are not structurally separated and therefore a resultant armature will have superior magnetic efficiency (low reluctance). However, since usually a winding is wound directly on each salient pole, winding operation is troublesome. Particularly, in case of an inner rotor type electric rotary machine, winding operation is quite difficult. As a result, the winding operation will require a longer time and a space factor of the winding cannot be increased. Furthermore, because the winding is done by flyer winding, tensional stress may be applied to a wire during the winding operation to restrict insulation reliability of the winding portion.

However, in recent years, a rare earth magnet having high energy product has been developed and structure of the electric rotary machine has been reviewed by analysis of magnetic circuits using a computer. This results in findings that a divided armature type electric rotary machine, in which improvement in efficiency in the winding operation and increase in space factor are expected while reluctance is slightly increased, can achieve higher performance and low cost. Therefore, there is a growing demand for division of an armature.

As an example of the divided type armature, a conventional type armature yoke which is constituted by a plurality of ring-shaped plate yokes stacked in their axial direction is divided into salient pole portions and a winding is provided on each of the separated salient pole portions, then the separated salient pole portions are joined at divided places by laser or the like (welding or the like) to be reinstated into an armature. This method needs much labor because the conventional armature is once divided and then joined again. Moreover, the separated salient pole portions have to be put back together while maintaining the stacked condition appropriate, so it is necessary to set the separated salient pole portions in a die, tooling or the like which ensures assembling precision satisfactorily and to securely weld them on a one-by-one basis. Therefore, high precision is required and workability is low. Furthermore, mechanical and magnetic characteristics are significantly degraded at the joined (welded) portions inherently. Thus, the conventional divided type armature still has a few problems to be solved.

In order to solve such defects involved in the divided type armature as set forth above, the inventors have proposed methods to divide an armature into a structure completely different from the conventional structure in Japanese Unexamined Patent Publication No. Heisei 11-355981 and Japanese Unexamined Patent Publication No. 2000-4566. These methods apply an invention in the armature structure, which is adapted to satisfactorily turn features of the divided type to advantage for the winding operation and joining the salient poles. However, a hole for positioning and joining the salient poles is required on a stator ring (which refers to "outer casing of the electric rotary machine") which functions as a magnetic circuit as well. The hole presents discontinuity in the magnetic circuit to cause outward emission of leakage flux, which is disadvantageous in view of electromagnetic compatibility (EMC), etc. to which importance is attached recently. Another problem resides in lowering of electromagnetic conversion efficiency, which is caused by increase in reluctance in the ring itself and salient pole joining portions. And still another problem resides in degrading external appearance of a product because the lower ends of the salient poles are exposed through the hole or groove of the stator ring.

SUMMARY OF THE INVENTION

It is an object of the present invention to provide a rotary gap type electric rotary machine with a divided armature comprising a plurality of separated salient poles and a ring which magnetically and mechanically couples the salient poles, wherein a stator ring is provided with no hole for positioning and fixing separated salient poles whereby leakage flux resulting from magnetic discontinuity can be reduced and at the same time electromagnetic conversion efficiency of an electric rotary machine can be enhanced.

Another object of the invention is to improve the external appearance and decency of an electric rotary machine by preventing the lower ends of the salient poles from being exposed through the outer surface of the electric rotary machine.

According to one aspect of the invention, there is provided a radial gap type electric rotary machine comprising a field magnetic pole consisting of a permanent magnet which is rotatably supported and an armature assembly having a plurality of separated salient poles opposing the field magnetic pole with a small air gap therebetween and radially arranged with respect to a rotation axis of the electric rotary machine, wherein the armature assembly includes a first ring made of a soft magnetic member for receiving a plurality of salient poles and a second ring made of a soft magnetic member for receiving the first ring.

The first ring has substantially rectangular slits or holes for guiding and fixedly holding the salient poles and the slit or the hole extends in parallel to the rotation axis.

Each salient pole of the armature assembly may be formed by stacking a plurality of soft magnetic plates in a circumferential direction.

The first and second rings may be fixedly bonded together.

One of the first and second rings may be made of a flat metal plate and formed into a ring configuration, and the salient pole is not positioned at a joint between a first rolling end and a second rolling end of the ring.

Both the first and second rings may be made of a metallic flat plate and formed into a ring configuration, and an angle formed by the joint between the first rolling end and the second rolling end of the ring may be set to have an offset in a range of from 30° to 330° inclusive in terms of a center angle.

The second ring may have a wall thickness equal to or greater than a wall thickness of the first ring, and the second ring may have an axial length equal to or greater than an axial length of the first ring.

Substantially disc shaped flanges having bearing mechanism at the center portions thereof may be fixed by welding on both axial end surfaces of second ring.

At least one of the first and second rings may be formed of vibration damping steel sheet which is made by integrating a synthetic resin made of a high polymeric material with a metal and has a damping effect.

The electric rotary machine may be a brushless DC motor.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in connection with preferred embodiments of the present invention by reference to the accompanying drawings. In the following description, numerous specific details are set forth in order to provide a thorough understanding of the present invention. It will be obvious, however, to those skilled in the art that the present invention may be practiced without these specific details.

Figure 1:
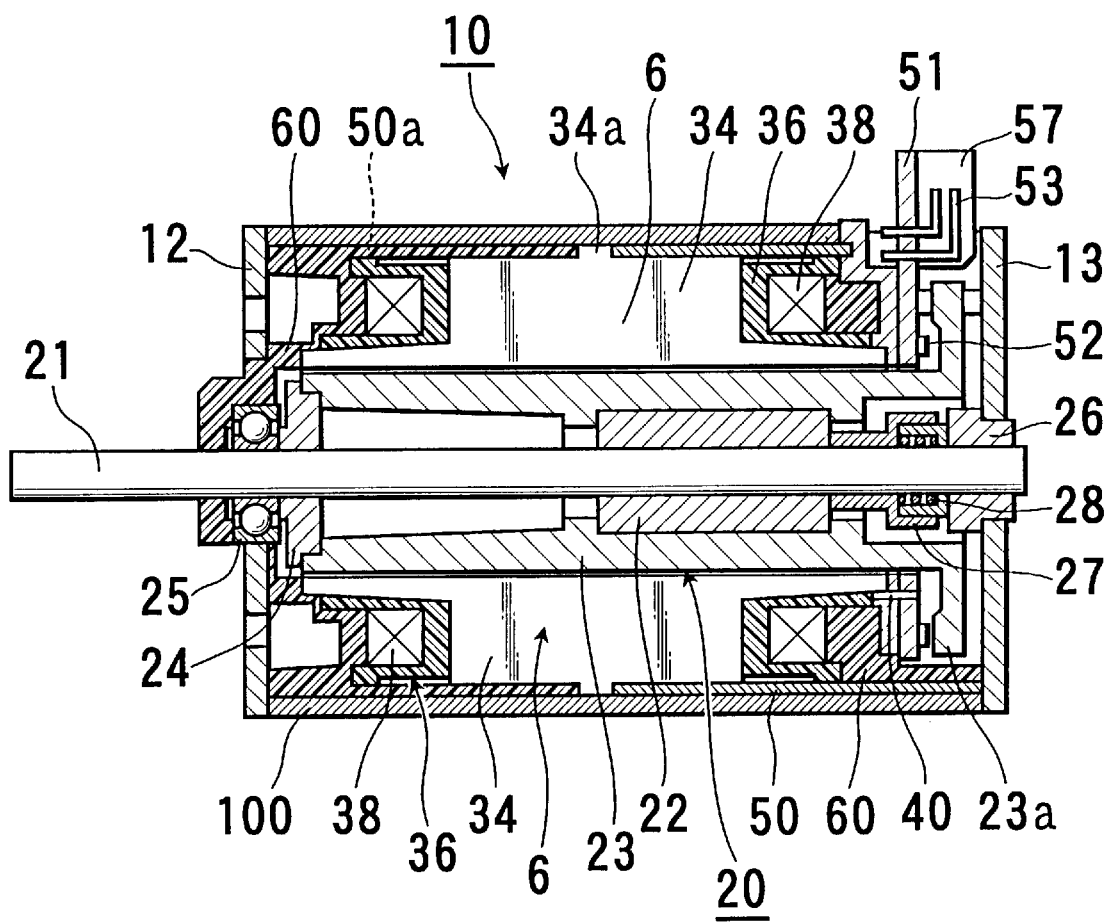
FIG. 1 is an axial section of a radial gap type brushless DC motor as one embodiment of an electric rotary machine according to the present invention.
Figure 2:
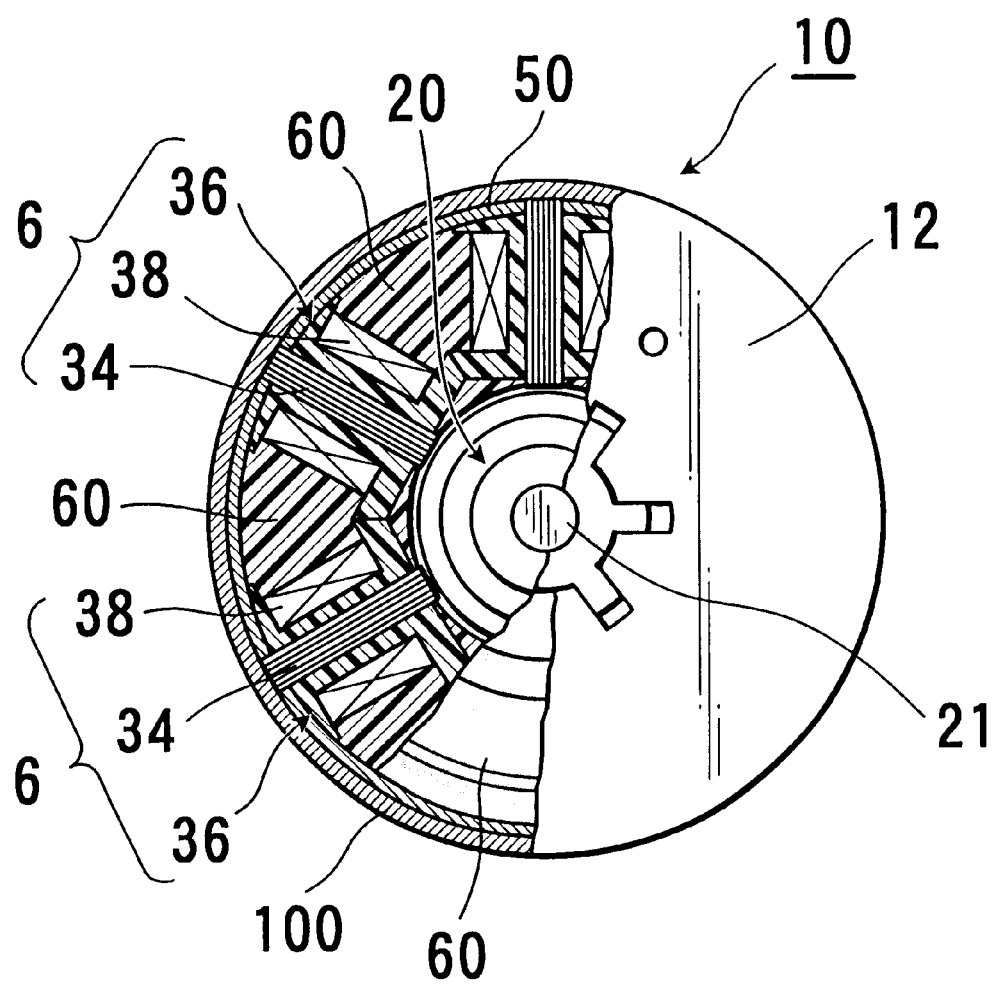
FIG. 2. is a partially sectioned front elevation of the DC brushless motor of FIG. 1 as viewed in axial direction.

FIGS. 1 and 2 show a structure of a three-phase inner rotor type brushless DC motor which has six salient poles and eight magnetic poles, as an example of an electric rotary machine of the present invention. The embodiment here shows a so-called integrally resin-molded armature assembly, in which a resin is filled for integral molding inside an armature assembly except a portion where a rotor field magnet is received.

A feature of the present invention resides in a magnetic circuit construction of an armature assembly constituted by a plurality of salient poles and two soft magnetic rings. The armature assembly is constituted in such a manner that the plurality of salient poles which are formed by concentrically winding a coil on a resin bobbin and inserting a substantially pole tooth stacked into a rectangular hole located at a center of the bobbin are radially fixed inside a pole tooth ring and that a stator ring is fitted over the pole tooth ring.

The present invention will now be discussed with reference to the drawings.

FIG. 1 is a section of a brushless DC motor as taken along a longitudinal axis thereof, and FIG. 2 is a half-sectioned front end of the brushless DC motor as viewed along the axial direction. The brushless DC motor is constructed with an armature assembly 10, flanges 12 and 13 arranged at both axial ends of the armature assembly 10 and a rotor assembly 20 rotatably arranged within the armature assembly 10.

The armature assembly 10 has a cylindrical stator ring 100 on the outer periphery thereof. A pole tooth ring 50 is fitted on the inner surface of the stator ring 100. Within the pole tooth ring 50, six salient poles 6 are arranged radially at an equiangular position of 60°.

Figures 3A, 3B:
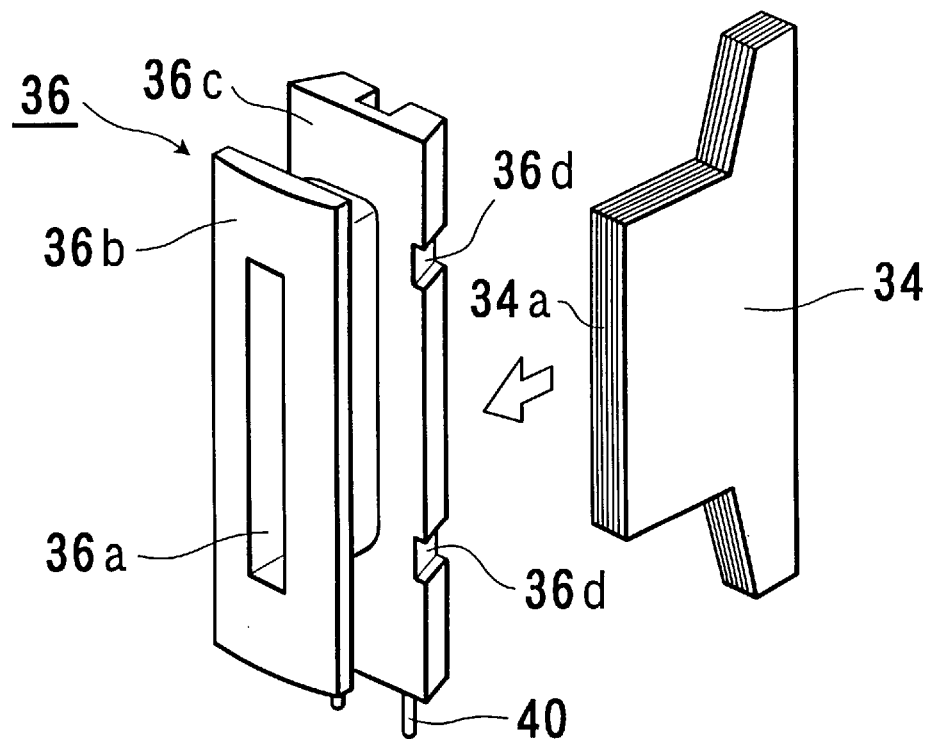
FIG. 3A is a perspective view of a bobbin of a salient pole.
FIG. 3B is a perspective view of polar teeth of the salient pole.
Figure 4:
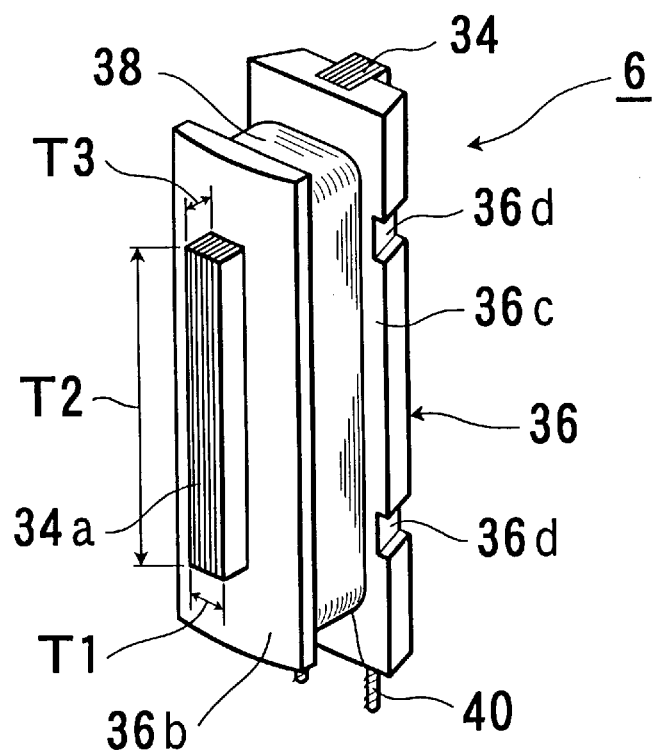
FIG. 4 is a perspective view of the salient pole in assembled condition.

The salient pole 6 is constructed in such a manner that a pole tooth 34 shown in FIG. 3B which is formed by stacking nine pieces of electromagnetic steel sheets each having a thickness of 0.35 mm and shaped into substantially T configuration is inserted into a rectangular hole 36a (width T1) of a resin bobbin 36 shown in FIG. 3A, and that a magnet wire 38 is wound between flange portions 36b and 36c of the bobbin 36 shown in FIG. 3A. The pole tooth 34 is formed in such a manner as to have its lower end (a left side thereof in FIG. 3B) projecting from the surface of the flange portion 36b by a prescribed height (height T3) across the entire length (length T2) thereof. One end of the magnet wire 38 is bound around a terminal 40 inserted at the lower end of the flange 36c of the bobbin 36. The salient pole 6 thus formed is shown in FIG. 4. Two recesses 36d are formed apart from each other on each side of the flange 36c of the bobbin 36 to form ports for injecting resin.

It should be noted that the pole tooth 34 may be, in addition to the electromagnetic magnetic steel sheets, of soft magnetic materials, such as ceramic moldings formed of sintered soft magnetic material powder, and so-called powder metallurgic moldings formed of sintered soft magnetic material consisting of micro-powder of pure iron or the like with its outer surface treated for insulation. Other soft magnetic metallic plates containing metallic materials of Fe—Cr type may not only maintain high reluctance but also has relatively high electric resistance thereby reducing eddy current loss, and at the same time, may be free of corrosion even without providing rust preventive treatment on the surface of respective plate components, which enables effective usage in a severe environment (such as automotive application).

Figure 5:
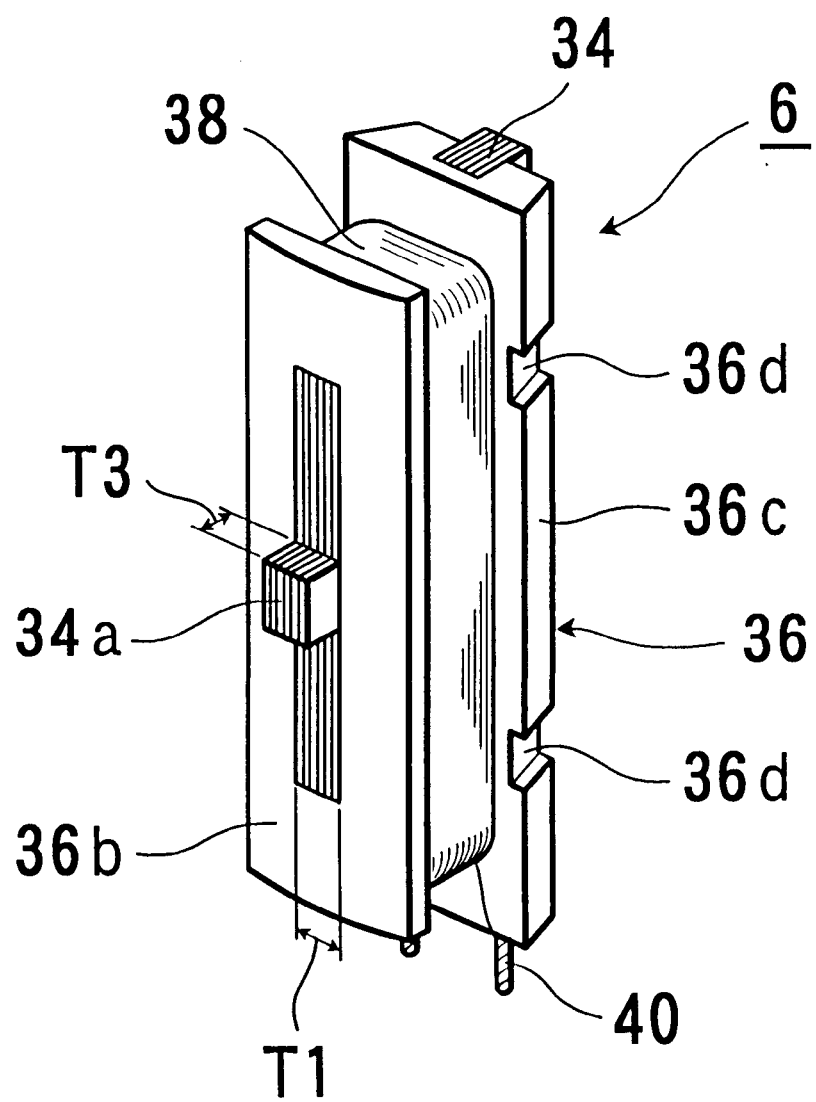
FIG. 5 is a perspective view showing another embodiment of a salient pole in assembled condition.

FIG. 5 shows another embodiment of a salient pole.

In the embodiment, when the pole tooth 34 is inserted in the bobbin 36, only projection 34a formed at substantially central portion of the lower end, instead of the entire lower end of the pole tooth 34 as shown in FIG. 4, projects from the surface of the flange 36b of the bobbin 36 by height T3.

When the salient pole 6 is formed of an electromagnetic steel sheet, a plurality of plate sheets are stacked in circumferential direction to form the pole tooth 34 as shown in FIG. 3B. This is not necessarily the case, when the salient pole 6 is formed of a soft magnetic material such as a ceramic molding of sintered soft mangetic material powder or a metallurgic molding.

Figure 6A:
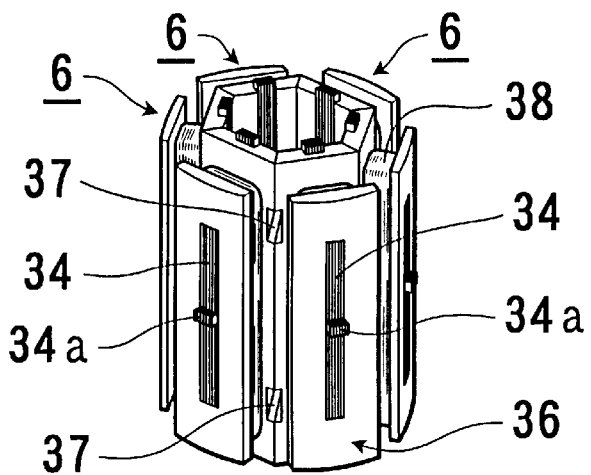
FIG. 6A is a perspective view of a salient pole assembly of an armature assembly of a brushless DC motor as another embodiment of the electric rotary machine according to the invention.
Figure 6B:
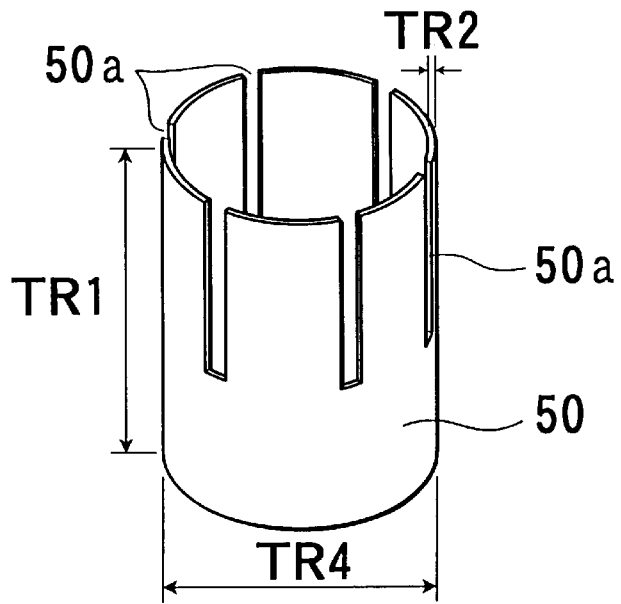
FIG. 6B is a perspective view of a pole tooth ring.
Figure 6C:
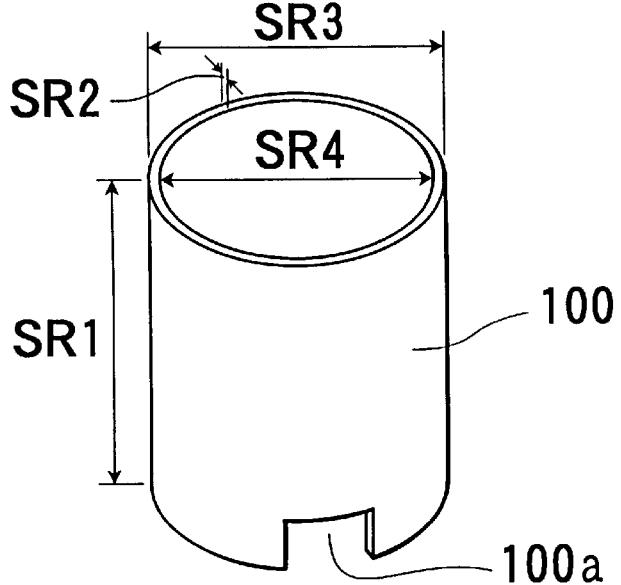
FIG. 6C is a perspective view of a stator ring.

FIGS. 6A, 6B and 6C are exploded perspective views showing the armature assembly, wherein FIG. 6A shows a salient pole assembly formed of six salient poles radially arranged at an equiangular position of 60° in such a manner that flanges 36c contact with each other. FIG. 6B shows a pole tooth ring 50 and FIG. 6C shows a stator ring 100.

As can be seen from FIG. 6A, resin injecting ports 37 are formed by the recesses 36d which mate with each other on the side edge of the flanges 36c of the bobbins 36 of two adjacent salient poles 6.

FIG. 6B shows the pole tooth ring 50 which is adapted to receive the salient pole assembly shown in FIG. 6A. The pole tooth ring 50 is made of a metallic cylinder and formed by drawing process. Six slits 50a are formed at an equiangular position in circumferential direction extending in the longitudinal direction (parallel to the rotary axis of the rotor field magnet) up to a substantially center portion. The shape of the slit 50a is rectangular. The slits 50a may be positioned not necessarily equidistantly from each other but arbitrarily attempting to enable adjustment of cogging torque. The slit 50a has a function to guide each salient pole 6 inside the pole tooth ring 50 when the salient pole assembly shown in FIG. 6A is inserted into the pole tooth ring 50 and to fix the salient pole 6 in the pole tooth ring 50 when the salient pole 6 is guided all the way in position. By setting the width of the slit 50a to be slightly smaller than the thickness of the projection 34a as viewed in a circumferential direction of the salient pole 6 shown in FIG. 5, the salient pole 6 may be press fitted into the pole tooth ring 50. In order to secure a greater press fitting force and magnetic coupling force, it is preferable that the salient pole 6 should be structured in such a manner that the projection 34a projecting from the flange 36b as shown in FIG. 4 has as long axial length T2 as possible. The inventors found in the experiments that it is effective when the length T2 of the projection 34a of the salient pole 6 is three to ten times as large as the circumferential thickness T1 of the projection 34a, and particularly effective when it is seven times as large.

Figure 7:
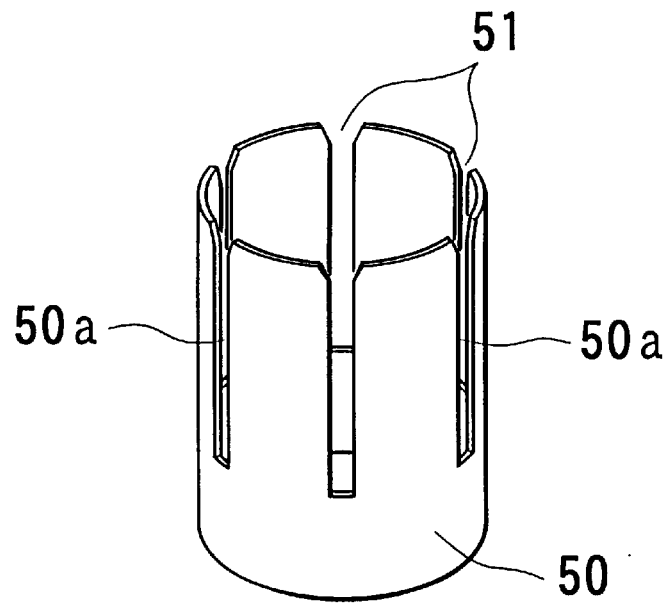
FIG. 7 is a perspective view of another embodiment of a pole tooth ring.

On the other hand, the height T3 of the projection 34a of the salient pole 6 may be set to be equal to or slightly smaller than the wall thickness of the pole tooth ring 50 so that the projection 34a does not project from the peripheral surface of the pole tooth ring 50 when the salient pole assembly is assembled into the pole tooth ring 50 thereby permitting the pole tooth 50 to fit smoothly into the stator ring 100. Thus, the stator ring 100 will suffer no deformation. If tapers 51 are provided at the inlet portion of the slit 50a as shown in FIG. 7, workability in assembling will be improved.

The stator ring 100 shown in FIG. 6C is designed to receive the pole tooth ring 50 with the salient pole assembly inserted. Unlike the pole tooth ring 50, the stator ring 100 has no positioning mechanism and no fixing mechanism on its outer or inner surface. Therefore, the internal diameter SR4 of the stator ring 100 is set to be equal to or slightly greater than the external diameter TR4 of the pole tooth ring 50 so that they may fit with each other upon insertion. In case of an outer rotor type motor, the stator ring 100 is disposed inside the pole tooth ring 50.

On the other hand, the axial length SR1 of the stator ring 100 is set to be equal to or larger than the length TR1 of the pole tooth ring 50, so that the pole tooth ring 50 can be completely received within the stator ring 100. Therefore, no mechanism for positioning and fixing the pole tooth ring 50 relative to the stator ring 100 will appear on the outer peripheral surface of the motor so that the magnetic discontinuity can be completely compensated by the stator ring 100 which covers the outside of the pole tooth ring 50. Thus, leakage flux can be significantly reduced. Of course, external appearance and decency of the motor as a product is greatly improved. On the other hand, in the embodiment, the wall thickness SR2 (1.0 t in the embodiment) of the stator ring 100 is set to be larger than the wall thickness TR2 (0.8 t in the embodiment) of the pole tooth ring 50 for the convenience of resistance welding flanges 12 and 13 to the stator ring 100(see FIG. 1). However, it is preferred to minimize the wall thickness SR2 as long as the resistance welding is applicable. It should be noted that a cutout 100a is provided on the lower end of the stator ring 100 for clearance of a connector 57 (see FIG. 1).

Here, explanation will be given on mechanical and magnetical connection between the pole tooth 34 of the salient pole 6, the pole tooth ring 50 and the stator ring 100.

In the embodiment, connection between the salient pole 6 and the pole tooth ring 50 is established by inserting the projection 34a of the pole tooth 34 into the slit 50a of the pole tooth ring 50. This is the important element of the present invention. However, the connecting structure should not be limited to the way examplified in the embodiment, but can be another way in which the projection of the salient pole loosely fits in the slit 50a of the pole tooth ring 50 and then the joint portion is welded for reinforcement.

In the present invention, the connection between the projection on the lower end of the salient pole and the stator ring 100 is critical from a standpoint of motor characteristics. Particularly, it is preferable in economical viewpoint that respective pole teeth inserted in one and the same bobbin have the same shape. In case of an inner rotor, it is preferable that the projections of each sheet of the pole teeth 34 are arranged along the inner surface of the stator ring 100 and contact therewith continuously and uniformly as shown in FIG. 9A.

Figures 9A, 9B:
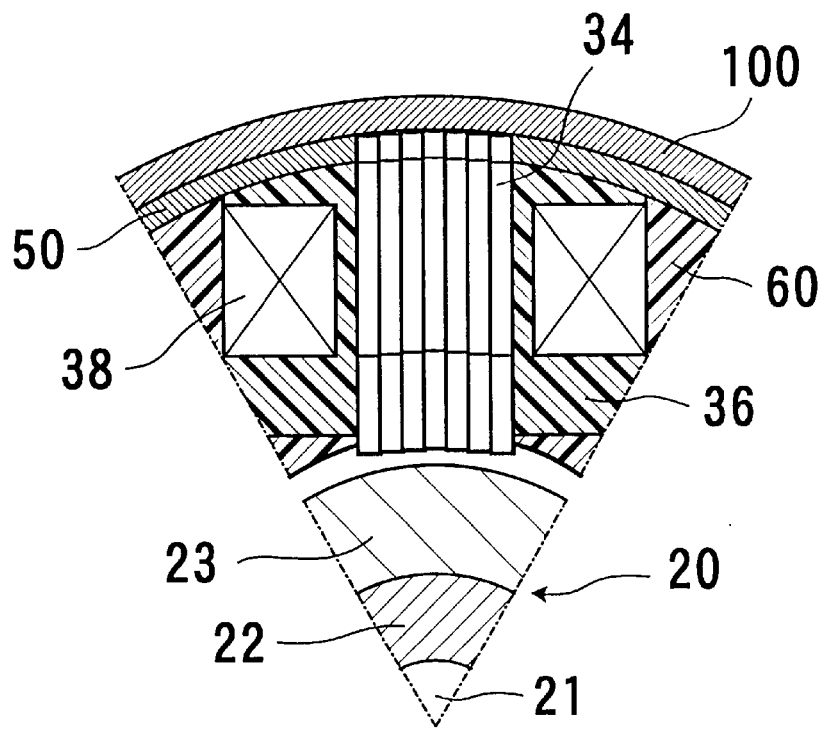
FIGS. 9A and 9B are diagrammatic illustration for explaining two different joining conditions of the salient poles, the pole tooth ring and the stator ring.

On the other hand, the projections of each sheet of the pole tooth 34 may also be arranged on a straight line to partially form a gap g as shown in FIG. 9B instead of being arranged along the inner surface of the stator ring 100. In comparison with the case shown in FIG. 9A, no significant degradation of characteristics was found in the experiment. This is because the larger the outer diameter is the smaller the gap is due to curvature.

The pole tooth ring 50 is preferably inserted into the stator ring 100 by press fitting or close fitting in consideration of magnetic characteristics. However no substantial degradation of characteristics was recognized when stop fitting was applied in consideration of workability. It will be effective in reducing vibration and/or noise if bonding is jointly employed depending upon the amount of gap between the pole tooth ring and the stator ring.

In more detail, FIGS. 9A and 9B show particular examples of connection condition between the lower end of the salient pole 6 and the inner surface of the stator ring 100. Each of FIGS. 9A and 9B shows a section of one sixth (for 60°) taken in a direction perpendicular to the rotary axis for a three-phase brushless DC motor having an outer diameter of 42 mm and including eight rotor field magnetic poles and six salient poles which are constituted by stacking seven electromagnetic steel sheets each having a thickness of 0.5 mm. FIG. 9A shows an example of the connection condition in which the projections 34a on the lower end of the salient pole 6 are arranged along the arc-shaped inner surface of the stator ring 100 and contact therewith continuously and uniformly. FIG. 9B shows another example of the connection condition in which the projections 34 or the lower end of the salient pole 6 (as well as the upper end line opposing the magnetic pole surface of the rotor field magnet 23) are arranged on a straight line instead of along and in contact with the arc-shaped inner surface of the stator ring 100. In FIGS. 9A and 9B, like reference numerals identify like components to those of FIGS. 1 and 2, and explanation is omitted.

In FIG. 9A, the pole tooth 34 consists of plate sheets each hearing the same shape and dimension. As the projections 34a on the lower end of the salient pole 6 are arranged along and in contact with the inner surface of the stator ring 100, an air gap defined between the upper end portion of the salient pole 6 and the rotor field magnet 23 is not uniform in the circumferential direction as shown. This is because each plate sheet of the pole tooth 34 has the same length and the inner surface of the stator ring 100 and the magnetic pole surface of the rotor field magnet 23 have different curvatures from each other. It may be possible to prepare respective plate sheets of the pole tooth 34 having different lengths (to make the pole tooth plate sheet at outer side longer and to make the pole tooth plate sheet at inner side shorter) to avoid the problem set forth above. For this purpose, however, a plurality of punching dies are required for the pole tooth plate sheets of slightly different dimensions, which is uneconomical in viewpoint of cost and management. It should be noted, however, that, in the example of the air gap shown in FIG. 9A (which is narrow at the center portion of the salient pole and increases as a distance increases from the center portion), cogging torque can be decreased in comparison with the case of a uniform air gap length, which is advantageous in view of motor characteristics.

FIG. 9B shows another example where the projections 34a at the lower end portion of respective plate sheets of the pole tooth 34 are arranged on a straight line instead of being arranged along and in contact with the inner surface of the stator ring 100. In this example, there may be undesired possibility that an air gap of maximum g (mm) (see FIG. 9B) is formed between the projection 34a of the pole teeth 34 and the inner surface of the stator ring 100. However, in the embodiment shown here, where the external diameter of the stator ring 100 is 42 mm and the pole tooth 34 consists of seven sheets of electromagnetic steel plates each having a thickness of 0.5 mm, the gap length g (mm) will be about 76 $\mu$m. This value is at most one third of 250 $\mu$m which is the average length of air gap between the rotor field magnet 23 and the upper end of the salient pole 6 and does not constitute a serious problem in practical use. In the embodiment of FIG. 9B, since only thing required is to align respective plate sheets of the pole tooth 34 on a straight line, stacking and crimping operation can be performed immediately after punching out the plate sheets of the pole tooth 34. If the plate sheets of the pole tooth 34 are crimped in advance, the pole tooth 34 can be inserted into the bobbin significantly more easily in comparison with when not crimped. There is another advantage that vibration caused by excitation in motor operation can be reduced.

Hitherto, discussion has been given on the armature assembly 10. Hereafter, discussion will be given on the rotor assembly 20 with reference to FIG. 1.

The construction of the rotor assembly 20 of the brushless DC motor in the embodiment is the same as the conventional one and therefore only brief explanation will be given. The rotor assembly 20 has a sleeve 22 fixed on a shaft 21 as a center of rotation and a rotor field magnet 23 is fixedly arranged on the sleeve 22. In the embodiment, the rotor field magnet 23 is a plastic magnet formed by molding a resin matrix (e.g. 6—6 nylon) made of high polymeric material and containing ferrite powder which is inexpensive and has high moldability. A flange 23a integrally formed on the right end of the rotor field magnet 23 is a rotor position detecting magnet portion which can accurately detect the position of the rotor assembly 20 in cooperation with a Hall sensor 52 arranged on a printed circuit board 51. On one axial end of the rotor assembly 20 (the left end in the drawing), a spacer 24 and a ball bearing 25 are provided on a flange 12. On a flange 13 at the opposite end of the rotor assembly 20, a sleeve bearing 26 is provided. Between the sleeve bearing 26 and the sleeve 22, a preload spring holder 27 and a preload spring 28 are arranged. An appropriate preload is applied to the ball bearing 25 by the preload spring 28. The shaft 21 is rotatably supported by the ball bearing 25 and the sleeve bearing 26.

Figure 8:
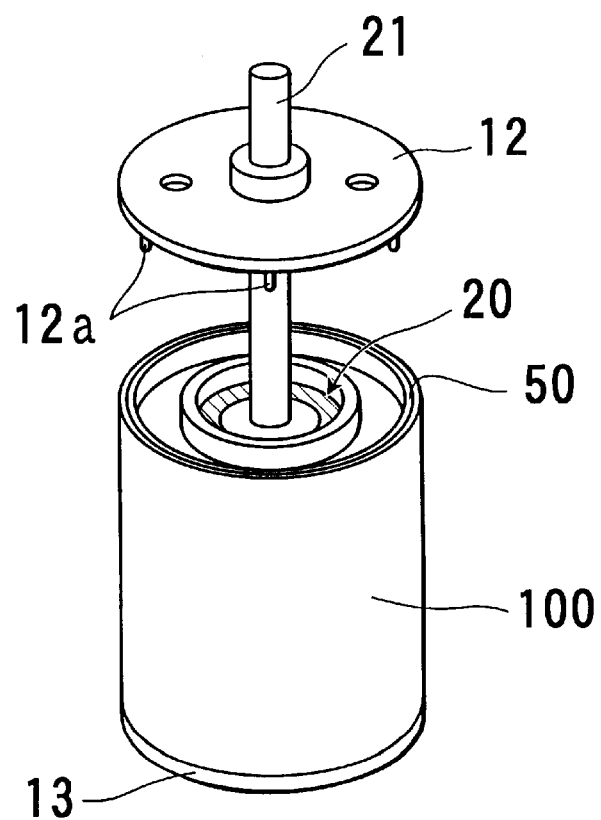
FIG. 8 is a perspective view showing the brushless DC motor of FIG. 1 with one flange removed.

FIG. 8 shows the motor with the flange 12 removed. As can be seen in FIG. 8, a plurality (six in the embodiment) of tiny projections 12a (having a height of 0.3 mm, for example) are formed on the inner surface of the flange 12 at places which are to contact the end face of the stator ring 100. The flange 12 is welded to the stator ring 100 by way of projection welding, in which pressure and electric power are applied while the tiny projections 12a are kept in contact with the end face of the stator ring 100. The flange 13 is earlier welded to the stator ring 100 in the same manner.

By using this welding method, a plurality of places can be welded simultaneously and with high finish quality. Therefore, the method set forth above is quite suitably applicable to the electric rotary machine of the present invention with regard to productivity, quality, external appearance and decency.

In the embodiment, the inside of the armature assembly 10 is entirely molded including the ball bearing 25 except a space for receiving the rotor assembly 20, with a resin 60 of high polymer material. The resin 60 is filled in a space between the salient poles 6, particularly around a magnet wire 38, also in the resin injecting ports 37 formed between adjacent salient poles 6 (see FIG. 6A) and in the slits 50a of the pole ring 50. Therefore, not only the salient poles are integrated between themselves but also the salient pole assembly, the pole tooth ring 50 and the stator ring 100 are integrated as a whole.

Following advantages are expected by integrally molding the entire armature assembly with a resin:

(1) Since the coils, the pole teeth, the bobbins, the pole tooth ring and the stator ring are all integrated with resin, vibration and noise generated by the motor can be reduced.

(2) Since the coils, the pole teeth, the bobbins, the pole tooth ring and the stator ring are all integrated completely with resin, heat conduction higher than that of air can be achieved to suppress increase in coil temperature at the same output for the same efficiency.

(3) Since an air gap surface between the salient pole of the armature assembly and the rotor field magnet can be as a reference surface when designing a molding die, high precision of the air gap surface finish which requires high dimensional precision can be ensured. Accordingly, an air gap with a shorter length in the radial direction of the motor causes no problem of possible touch with the rotor field magnet.

(4) Integration of even the bearing housing with the armature assembly secures a center of rotation with high precision at the same time. This is also effective in removing a fear of touch of the armature assembly with the rotor field magnet, which may be caused by setting an air gap length shorter.

While no problem will be raised if the overall armature assembly is integrally molded with a high polymer resin as in the embodiment, a fine gap is apt to be formed between the pole tooth ring 50 and the stator ring 100 if the armature assembly is not integrated. The gap thus formed can be a cause of noise generation during operation. In such a case, noise can be prevented by filling bonding material in the gap. Particularly, to fill bonding material of low viscosity in the fine gap is effective in ensuring electrical insulation between both of the rings and mechanical strength, whereby eddy current loss at the rings decreases possibly improving efficiency and whereby vibration and noise are reduced.

Figure 10A:
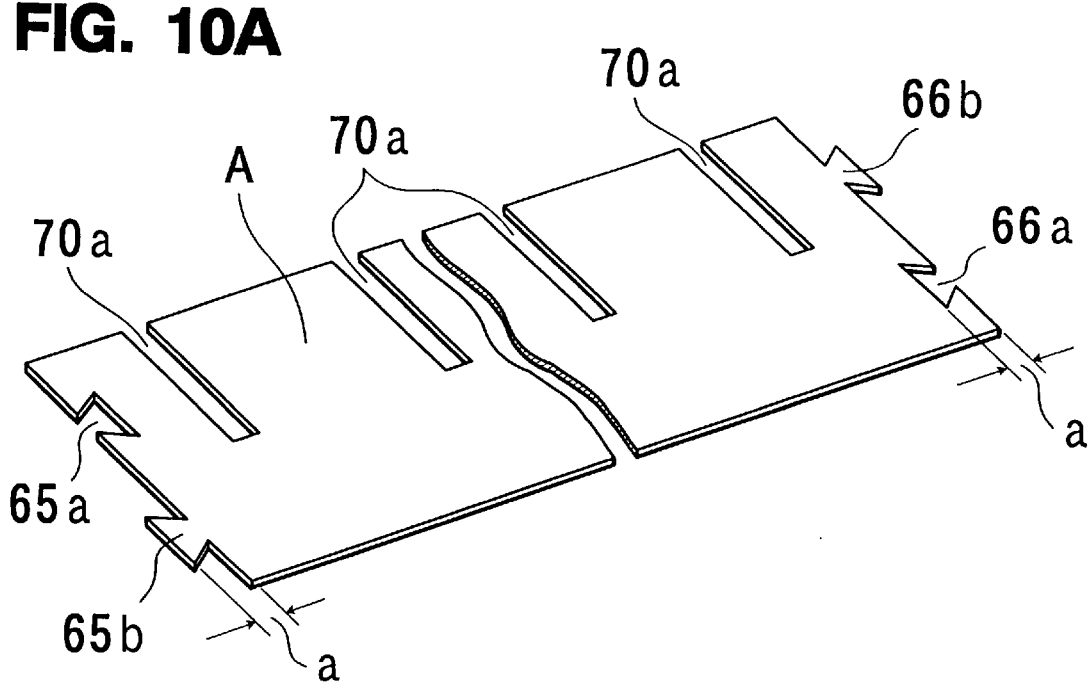
FIG. 10A is a perspective view of a sheet member for fabricating a pole tooth ring as a second embodiment.
Figure 10B:
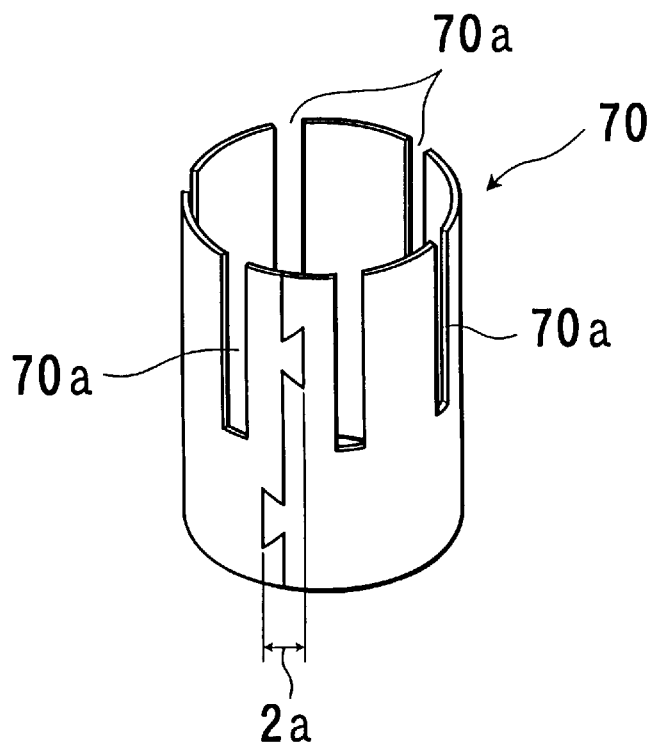
FIG. 10B is a perspective view of the pole tooth ring fabricated of the sheet member.

FIGS. 10A and 10B show the second embodiment of the pole tooth ring.

A pole tooth ring 70 shown in FIG. 10B is produced in such a way that slits 70a are punched out at a predetermined interval in a soft magnetic sheet member A (such as galvanized steel sheet, nickel plated steel sheet, pure iron sheet or the like), and that thereafter the sheet member A is rolled into a ring configuration. Thus, the pole tooth ring can be produced without using high level drawing process.

When the salient pole is assembled into the pole tooth ring 70 thus produced, it is preferred to arrange the slits 70a such that the joint between a first rolling end and a second rolling end of the sheet member A does not coincide with the lower end of the salient pole. In the embodiment, the joint is arranged to be positioned in the middle between the salient poles. Thus, respective salient poles can be uniformly, firmly and stably engaged with the slits 70a of the pole tooth ring 70.

In the embodiment shown in FIG. 10A, a recess 65a and a protrusion 65b are formed on the first rolling end (the leftmost end of the sheet member A in the drawing) of the sheet member A, and a protrusion 66b and a recess 66a are formed on the second rolling end (the rightmost end of the sheet member A in the drawing) thereof. The recess 65a on the first rolling end and the protrusion 66b on the second rolling end are mated with each other and the protrusion 65b on the first rolling end and the recess 66a on the second rolling end are mated with each other to form the ring 70 with high precision. Therefore, even when some or less external force is applied to the ring 70 during assembly process, diametrical dimension will never suffer a change. The shapes of the recesses and the protrusions are not limited to those as shown. It will do if both the first and second rolling ends are made straight and made to simply abut each other. It is to be noted that the suggestion that the salient pole should not be positioned at the joint between the first rolling end and the second rolling end means that a mechanism for inserting the salient pole, that is a slit or hole, should not be provided in a region identified by 2a (see FIGS. 10A and 10B) which is necessary for formation of the recesses and the protrusions.

The stator ring 100 may also be made of a soft magnetic plate and formed into a ring configuration. As described above, the stator ring 100 does not require a mechanism for inserting the salient pole.

When the pole tooth ring 50 and the stator ring 100 are made of a sheet member, the positional relation between the joints of both of the rings is critical. It is essential that the joints do not overlap with each other at regions which include the recesses and the protrusions (namely, the region identified by 2a in FIG. 10B). The shape and size of the recesses 65a and 66a and the protrusions 65b and 66b jointing the first rolling end and the second rolling end of the sheet member A are determined depending on the ring diameter, and in case of small size electric rotary machines having a diameter of 100 mm or less, an angle formed by the joints of the rings should necessarily be set between 30° and 330° inclusive in terms of a center angle with each other as viewed at the center of the joints. In the experiment, it was confirmed that sufficient effect could be obtained by setting the angle at 90°. It was mentioned above that vibration and noise can be reduced if the armature assembly is integrally molded with a resin. It should be noted that vibration and noise can also be reduced if the pole tooth ring and the stator ring are made of a vibration damping steel sheet.

Figure 11A:
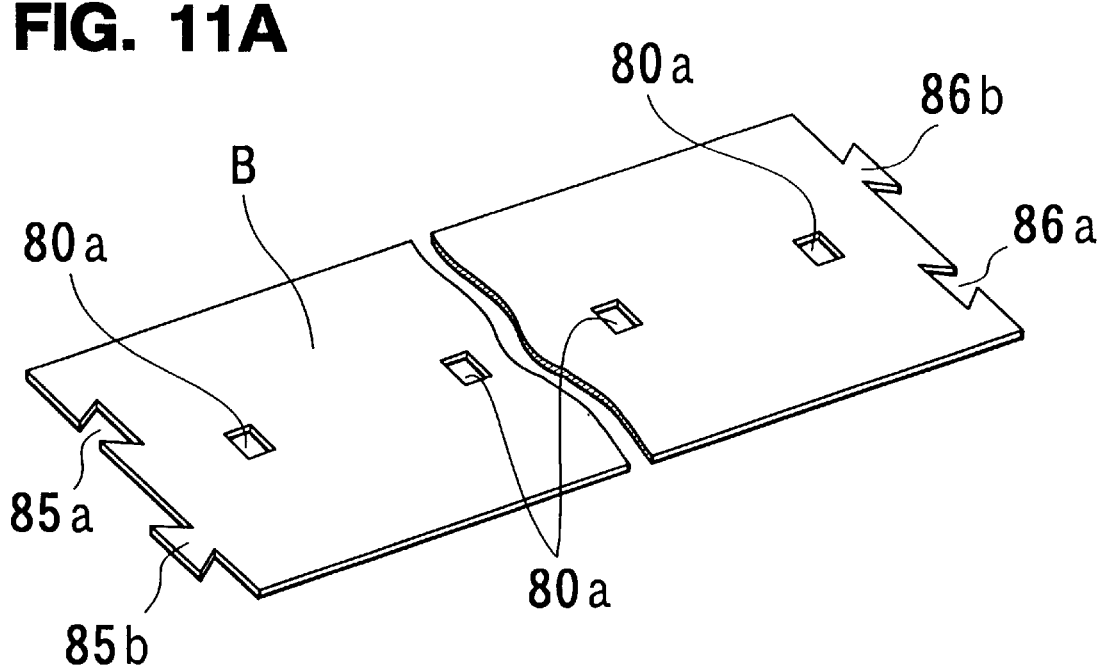
FIG. 11A is a perspective view of a sheet member for fabricating a pole tooth ring as a third embodiment.
Figure 11B:
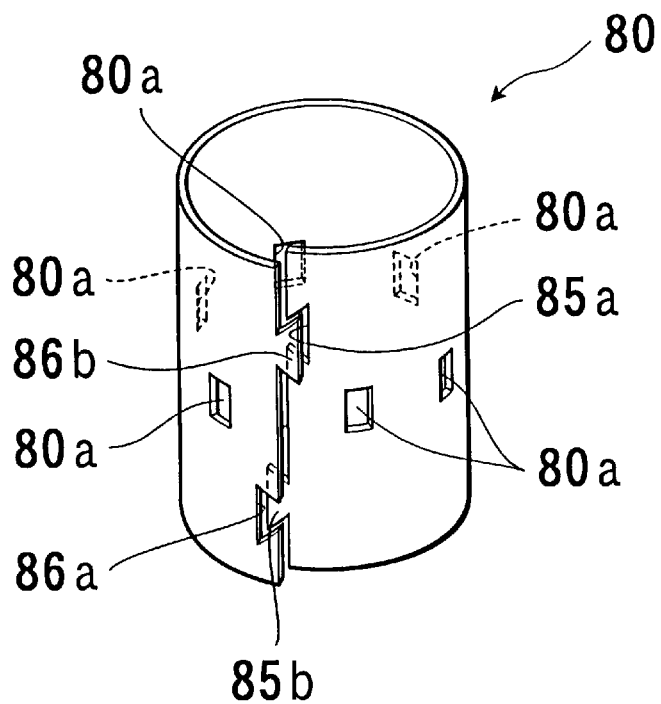
FIG. 11B is a perspective view of the pole tooth ring fabricated of the sheet member.

FIGS. 11A and 11B show a third embodiment of a pole tooth ring.

This embodiment is different from the second embodiment shown in FIGS. 10A and 10B regarding means for fixing and maintaining salient poles to be provided in the pole tooth ring. As shown in FIG. 11A, rectangular or square holes 80a are formed at substantially central (as viewed widthwise) portions of a sheet member B formed of a soft magnetic material. A recess 85a and a protrusion 85b are formed on the first rolling end (the leftmost end of the sheet member B in the drawing) and a protrusion 86b and a recess 86a are formed on the second rolling end (the right end of the sheet member B). FIG. 11b shows an unfinished state of a pole tooth ring 80 manufactured of the sheet member B thus worked.

The salient pole assembly shown in FIG. 6A which has been fabricated in a separate process is rolled up by the sheet member B already worked in such a manner that the projections of respective salient poles of the salient pole assembly fit in respective holes 80a of the sheet member B. Then, the protrusion on the first rolling end and the recess on the second rolling end are engaged with each other, and vice versa, to complete the pole tooth ring 80.

Finally, applying the present invention to a three phase brushless DC motor which uses a low-cost plastic ferrite magnet as rotor field magnet 23 and has an external diameter of 42 mm, an axial length of 60 mm and which has six salient poles and eight rotor magnetic poles, it was confirmed in the experiment that a maximum efficiency for electromechanical conversion in the motor of the present invention having a double ring structure comprising the pole tooth ring and the stator ring was increased from 50% to 60% showing improvement by 10% in comparison with a conventional motor having a single ring structure. This is because of reduction in the current value under no load condition and it is considered that magnetic efficiency has been improved and resultingly electromagnetic conversion efficiency has been improved.

Accordingly, it should be easily inferred that a still higher efficiency can be achieved by employing a high performance magnet such as Nd—Fe—B or Sm—Co type magnet.

With the present invention, since the salient poles are magnetically coupled to each other with the double ring structure, reluctance in the armature can be reduced. Further, the hole, groove or the like for positioning and fixing the salient poles will never be exposed on the external surface of the electric rotary machine.

As a result, the reluctance of the armature can be reduced with the result that the electromagnetic conversion efficiency of the electric rotary machine is improved. Furthermore, as there is no magnetic discontinuity on the surface of the electric rotary machine, leakage flux can be reduced and at the same time pop-up of discontinuous increase in leakage flux can be eliminated. Namely, a kind of magnetic shield effect can be provided on the stator ring. Furthermore, as the lower end of the salient pole will never be exposed at the outer surface of the electric rotary machine, the product may provide superior external appearance which enhances value of products.

Furthermore, core loss or eddy current loss can be reduced for improvement in efficiency if the pole tooth is formed by stacking sheet members such as electromagnetic steel sheets whose surfaces are electrically insulated.

Vibration and noise can be reduced by bonding and fixing a gap between the pole tooth ring and the stator ring or, in some cases, a gap between respective plate sheets of the pole tooth. Core loss or eddy current loss of the ring can also be reduced.

The pole tooth ring or the stator ring or both can be manufactured without using a high level drawing technology if made using the soft magnetic sheet member and processing it into a ring configuration. Reliability of fixing the salient poles can be improved and outward emission of the leakage flux can be held down by appropriately setting the shape and/or the positional relationship of the first rolling end and the second rolling end of the sheet member.

The respective flanges can be easily welded at each of both ends of the stator ring by resistance welding and sufficient welding margin can be provided by making the thickness of the stator ring larger than the thickness of the pole tooth ring and at the same time by making the axial length of the stator ring larger than the axial length of the pole tooth ring. As a result, even if the sheet member processed into a ring shape is employed, sufficient welding strength can be certainly obtained and sufficient strength against external mechanical stress or external force can be provided.

Furthermore, in case of an inner rotor type brushless DC motor, winding operation can be significantly facilitated and space factor can be improved. As a result, it is possible to obtain a motor having small leakage flux and superior electromagnetic conversion efficiency as well.

Although the present invention has been illustrated and described with respect to exemplary embodiments, it should be understood by those skilled in the art that the foregoing and various other changes, omission and additions may be made therein and thereto, without departing from the spirit and scope of the present invention. Therefore, the present invention should not be understood as limited to the specific embodiments set out above but to include all possible embodiments which can be embodied within a scope encompassed and equivalent thereof with respect to the feature set out in the appended claims.

What is claimed is:

1. A radial gap type electric rotary machine comprising:
   a field magnetic pole consisting of a permanent magnet which is supported rotatably;
   an armature assembly consisting of a plurality of separated salient poles which oppose said field magnetic pole with a small air gap therebetween and are radially arranged with respect to a rotation axis;
   wherein said armature assembly includes a first ring of a soft magnetic member for receiving said plurality of salient poles and a second ring of a soft magnet member for receiving said first ring.

2. A radial gap type electric rotary machine as set forth in claim 1, wherein said first ring has rectangular slits or holes for fixedly holding said salient poles, said slits or holes extending in parallel to said rotation axis.

3. A radial gap type electric rotary machine as set forth in claim 1, wherein each salient pole of said armature assembly includes a plurality of soft magnetic material sheets stacked in a circumferential direction of said armature assembly.

4. A radial gap type electric rotary machine as set forth in claim 1, wherein said first and second rings are fixedly bonded to each other.

5. A radial gap type electric rotary machine as set forth in claim 1, wherein at least one of said first and second rings comprises a metallic sheet formed into a ring configuration, and any one of said salient poles is not located at a joint between a first rolling end and a second rolling end of said ring.

6. A radial gap type electric rotary machine as set forth in claim 1, wherein each of said first and second rings comprises a metallic sheet formed into a ring configuration and an angle made by a joint between a first rolling end and a second rolling end is set to have an offset in a range of from 30° to 330° inclusive in terms of a center angle as viewed from the center of the joint.

7. A radial gap type electric rotary machine as set forth in claim 1, wherein a wall thickness of said second ring is equal to or greater than a wall thickness of said first ring, and an axial length of said second ring is equal to or greater than an axial length of said first ring.

8. A radial gap type electric rotary machine as set forth in claim 1, wherein substantially disc shaped flanges each having a bearing mechanism at its center are fixed to both axial end surfaces of said second ring.

9. A radial gap type electric rotary machine as set forth in claim 5 or 6, wherein at least one of said first and second rings is formed of a vibration damping steel sheet.

10. A radial gap type electric rotary machine as set forth in claim 1, wherein the machine is a brushless DC motor.

11. A radial gap type electric rotary machine as set forth in claim 1, wherein the machine has an inner rotor structure.

12. A radial gap type electric rotary machine as set forth in claim 1, wherein the machine has an outer rotor structure.

* * * * *